Sept. 8, 1931.  A. B. HENNINGER  1,822,775
SELF SUPPORTING CAR BODY OF SHEET METAL FOR MOTOR CARS
Filed Sept. 11, 1928  2 Sheets-Sheet 1
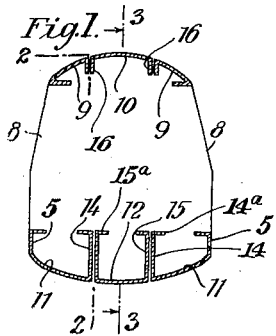
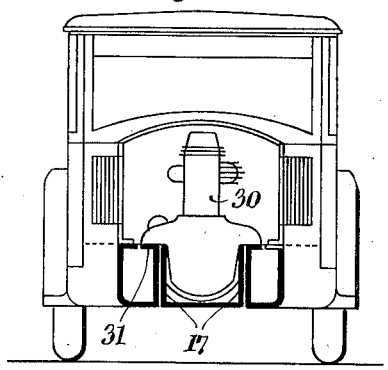
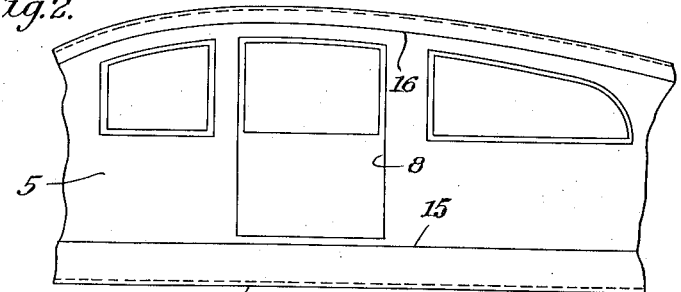
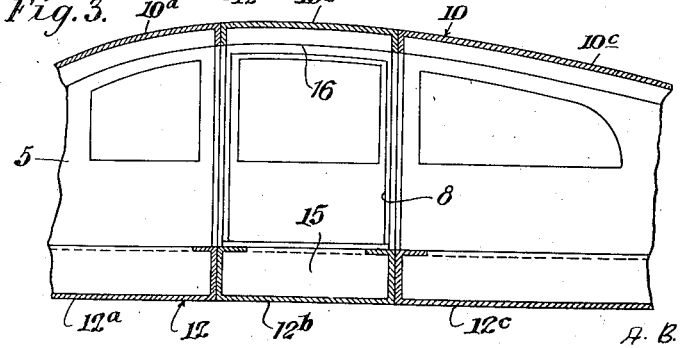

Sept. 8, 1931.  A. B. HENNINGER  1,822,775
SELF SUPPORTING CAR BODY OF SHEET METAL FOR MOTOR CARS
Filed Sept. 11, 1928  2 Sheets-Sheet 2
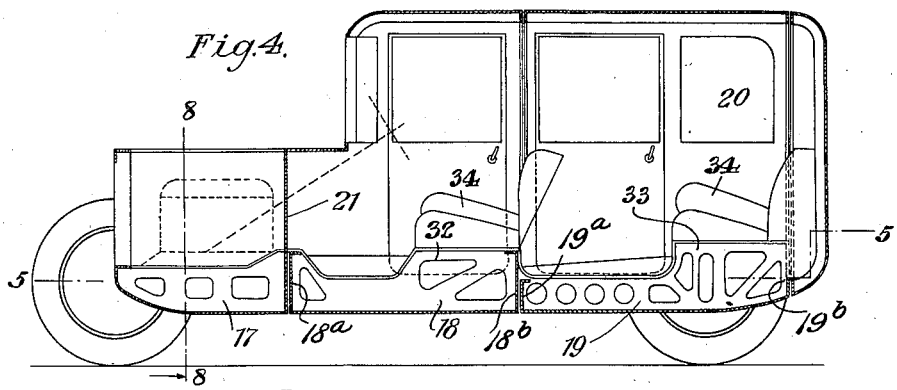
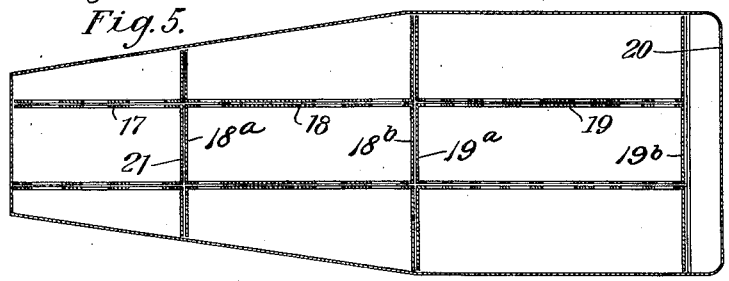
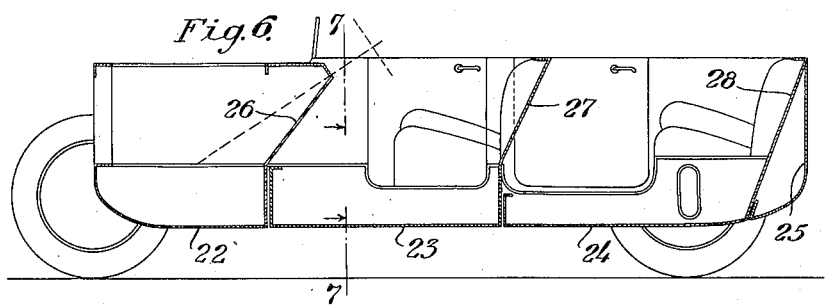
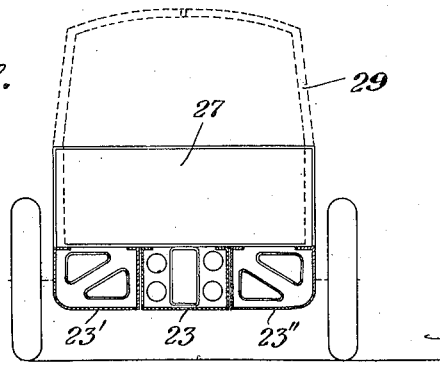

Patented Sept. 8, 1931

1,822,775

UNITED STATES PATENT OFFICE

ALBERT BERTHOLDT HENNINGER, OF BERLIN-HALENSEE, GERMANY

SELF-SUPPORTING CAR BODY OF SHEET-METAL FOR MOTOR CARS

Application filed September 11, 1928, Serial No. 305,268, and in Germany March 18, 1924.

This invention relates to improvements in self-supporting body structures for motor vehicles.

The invention has for its object to provide a car body which may be constructed of sheet metal and is composed of a plurality of longitudinal bearers which are shaped according to the form of the body and provided with horizontal and vertical members, the horizontal members constituting the bottom of the car body and the vertical members forming the sides of the car as well as the connections between the individual bearers.

A further object is the provision of a car body of the character described wherein the vertical members are bent laterally to provide horizontal reinforcements and supports for various parts of the body as, for instance, the car seats and propelling engine.

A further object of the invention is the provision of a car body wherein the bearers are so constructed as to provide an extremely strong and endurable structure capable of effectively withstanding twisting and like strains.

In the accompanying drawings wherein an approved embodiment of the invention is illustrated:

Fig. 1 is a transverse sectional view through a car body constructed in accordance with the invention taken in the plane of one of the entry doors and showing diagrammatically the structure of the bearers constituting the car body.

Fig. 2 is a sectional view on the line 2—2 of Fig. 1.

Fig. 3 is a sectional view on the line 3—3 of Fig. 1 showing a modification of the invention in which each individual bearer is sub-divided into a plurality of sections.

Fig. 4 is a diagrammatic sectional view through a complete motor vehicle constructed in accordance with the invention.

Fig. 5 is a horizontal section on the line 5—5 of Fig. 4.

Fig. 6 is a view similar to Fig. 4 illustrating a modification of the invention.

Fig. 7 is a vertical section on the line 7—7 of Fig. 6.

Fig. 8 is a vertical section on the line 8—8 of Fig. 4 showing the manner of supporting the vehicle propelling engine on the car body.

Referring to the drawings in detail, the car body is constituted by a plurality of longitudinal bearers 9, 10, 11 and 12. In the form of the invention illustrated in the drawing, three bearers are accommodated in the width of the body as, for instance, the bearers 11—11 and 12 for the bottom and 9—10 for the roof parts. As suggested in the Fig. 2 the bearers are suitably curved in conformity with the shape of the finished car body. The outside bearers are provided with high vertical webs 5 forming the car sides, while the lower substantially horizontal portions of the bearers constitute the bottom of the car body.

The mutually adjacent portions of the bearers are provided with high bent off vertical members 14, 15 and 16 which serve to connect the bearers together and also to reinforce the body structure. The vertical bent off members 14 and 15 are bent at their upper portions to provide horizontal members 14a and 15a, while the vertical webs 5 forming the car sides are provided as usual with doorways 8.

As suggested in Fig. 3 each of the longitudinal bearers, instead of extending throughout the entire length of the car body, may be sub-divided into a plurality of sections. In this figure the bearers 10 and 12 are shown and the sections thereof are indicated at 10a, 10b and 10c and at 12a, 12b and 12c.

The principle of the sub-divided bearers is further illustrated in Figs. 4—8, and referring in detail to Figs. 4 and 5 the sections of the sub-divided central bearer are indicated at 17, 18 and 19. Each of the sections 18 and 19 is provided with vertical members 18a and 18b and with the members 19a and 19b. The front portions of the bearers which support the vehicle engine are separated from the rear part of the car body by a vertical partition 21 and the vertical members at the adjoining portions of the several sections are suitably connected to form a unitary car body. Fig. 8 illustrates the vehicle engine 30 supported on the horizontal flanges 31 of the bearers forming the lower portion of the car body, while in Fig. 4 the portions 32 and 33 of the vertical flanges of the bearer sections are shown as increased in height so as to provide supports for the car seats 34. The back wall of the car body is constituted by a shell 20.

In the modification of the invention illustrated in Figs. 6 and 7 the bearers are shown as constructed for use in connection with an open car body. In this arrangement the individual bearers are also sub-divided into a plurality of sections the same as shown in Figs. 4 and 5 and the center bearer is shown as composed of the three sections 22, 23 and 24. In these two figures the outer central bearers are indicated generally at 23' and 23'', while the rear end of the body is constituted by a shell 25. According to this embodiment of the invention inclined reinforcing partitions 26, 27 and 28 are provided of which the partition 26 serves as a dash board while the two rear partitions 27 serve as supporting means for the backs of the vertical seats.

Fig. 7 shows in dotted lines at 29 the application of a cover or top to the open car body which may be applied in any well known manner.

What I claim is:

1. A substantially self-supporting car body for automobiles, comprising at least three longitudinal bearers corresponding to the shape of the car body and having substantially horizontal flanges forming the bottom of the car body, certain of said bearers having high vertical webs forming the car sides, vertical members bent off the flanges and integral with the vertical webs and extending into the interior of the car body for stiffening the longitudinal bearers and providing a connection therebetween, and horizontal members bent off the vertical members serving as bearing supports for the motor and seats.

2. A substantially self-supporting car body for automobiles, comprising at least three longitudinal bearers corresponding to the shape of the car body and having high vertical webs and substantially horizontal flanges forming the bottom of the car body, vertical members bent off the flanges for stiffening the longitudinal bearers and connecting them, horizontal members bent off the vertical members serving as bearing supports for the motor and seats, at least three longitudinal bearers forming the roof of the car body, and vertical members bent off the last mentioned bearers for stiffening and connecting the latter.

3. A substantially self-supporting car body for automobiles, comprising at least three longitudinal bearers corresponding to the shape of the car body and sub-divided into several sections and having substantially horizontal flanges forming the bottom of a car body, certain of the bearers having high vertical webs forming the car sides, vertical members bent off the flanges and integral with the vertical webs and extending into the interior of the car body for stiffening and connecting the longitudinal bearers, horizontal members bent off the vertical members serving as bearing supports for the motor and seats, and vertical flanges on the several sections of the longitudinal bearers for the connection thereof and for transversely stiffening the car body.

4. A substantially self-supporting car body for automobiles, comprising at least three longitudinal bearers corresponding to the shape of the car body and subdivided into several sections and having substantially horizontal flanges forming the bottom of the car body, certain of the bearers having high vertical webs forming the car sides, vertical members bent off the flanges and integral with the vertical webs and extending into the interior of the car body for stiffening and connecting the longitudinal bearers, horizontal members bent off the vertical members serving as bearing supports for the motor and seats, vertical flanges on the several sections of the longitudinal bearers extending transversely of the car body connecting the sections and stiffening the car body and forming the dash board and seat supports.

5. A substantially self-supporting car body for automobiles, comprising at least three longitudinal bearers corresponding to the shape of the car body and subdivided into several sections and having substantially horizontal flanges forming the bottom of the car body, certain of the bearers having high vertical webs forming the car sides, vertical members bent off the flanges and integral with the vertical webs and extending into the interior of the car body for stiffening and connecting the longitudinal bearers, horizontal members bent off the longitudinal bearers serving as supports for the motor and seats, vertical flanges on the several sections of the longitudinal bearers connecting the sections and transversely stiffening the car body, and a separate shell formed in one piece and serving as the back wall of the car body.

In testimony whereof I affix my signature.
ALBERT BERTHOLDT HENNINGER.